US011258617B1

(12) United States Patent
Peddada et al.

(10) Patent No.: US 11,258,617 B1
(45) Date of Patent: Feb. 22, 2022

(54) DEVICE IDENTITY USING KEY AGREEMENT

(71) Applicant: salesforce.com, inc., San Francisco, CA (US)

(72) Inventors: Prasad Peddada, Alameda, CA (US); Taher Elgamal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/111,972

(22) Filed: Dec. 4, 2020

(51) Int. Cl.
*H04L 9/32* (2006.01)
*H04L 9/08* (2006.01)
*H04L 9/30* (2006.01)

(52) U.S. Cl.
CPC .......... *H04L 9/3268* (2013.01); *H04L 9/0825* (2013.01); *H04L 9/0838* (2013.01); *H04L 9/3073* (2013.01)

(58) Field of Classification Search
CPC ... H04L 9/3268; H04L 9/0825; H04L 9/0838; H04L 9/3073; H04L 9/3247; H04L 63/0823; H04L 9/3263; H04L 63/061; H04L 9/0844; H04L 63/0869; H04L 9/0841; H04L 67/42; H04L 9/085; H04L 9/3213; H04L 9/3013; H04L 9/3066; H04L 9/3273; H04L 63/0838; H04L 2463/062; H04L 63/067; H04L 9/0822; H04L 29/06965; H04W 12/069; H04W 12/041; H04W 12/0471; G06F 21/33; G06F 21/606; G06F 7/725; G06F 12/1408; G06Q 20/3829
See application file for complete search history.

(56) References Cited

U.S. PATENT DOCUMENTS

| | | | |
|---|---|---|---|
| 7,181,620 B1* | 2/2007 | Hur | H04L 9/083 713/168 |
| 2017/0034168 A1* | 2/2017 | Wilson | H04L 63/0823 |
| 2017/0272245 A1* | 9/2017 | Norton | H04L 9/0894 |
| 2018/0375663 A1* | 12/2018 | Le Saint | H04L 9/088 |

FOREIGN PATENT DOCUMENTS

| | | | | |
|---|---|---|---|---|
| CN | 108111301 A | * | 6/2018 | |
| WO | WO-2019105571 A1 | * | 6/2019 | H04L 9/3073 |

* cited by examiner

*Primary Examiner* — Techane Gergiso
(74) *Attorney, Agent, or Firm* — Holland & Hart LLP

(57) ABSTRACT

A client device may be provisioned with a digital certificate to support various operations. The client may transmit a certificate request to a server. The server may initiate a key agreement process using a short-lived private key generated at the server and a public key of the device to derive a symmetric key. The symmetric key may be used to encrypt a payload that includes the digital certificate and an associated private key. Further, the server initiates a key agreement process using the partial private key that was generated for the client and the short-lived public key. A partial key agreement result, and the encrypted payload may be transmitted to the client. The client may complete the key agreement process using the partial key agreement result and a respective portion of the private key. The client may derive the encryption key and decrypt the payload to access the digital certificate.

20 Claims, 10 Drawing Sheets

DEVICE IDENTITY USING KEY AGREEMENT

FIELD OF TECHNOLOGY

The present disclosure relates generally to database systems and data processing, and more specifically to device identity based on key agreement.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a cloud platform may support utilization of cryptographic protocols or primitives to support security data storage and retrieval, secure data transmission, among other uses. To support such techniques, cryptographic keys may be secured in secure enclaves of devices, such as a secure chip. If a cryptographic key is compromised, then various data, such as user data may be compromised.

DETAILED DESCRIPTION

Figure 1:
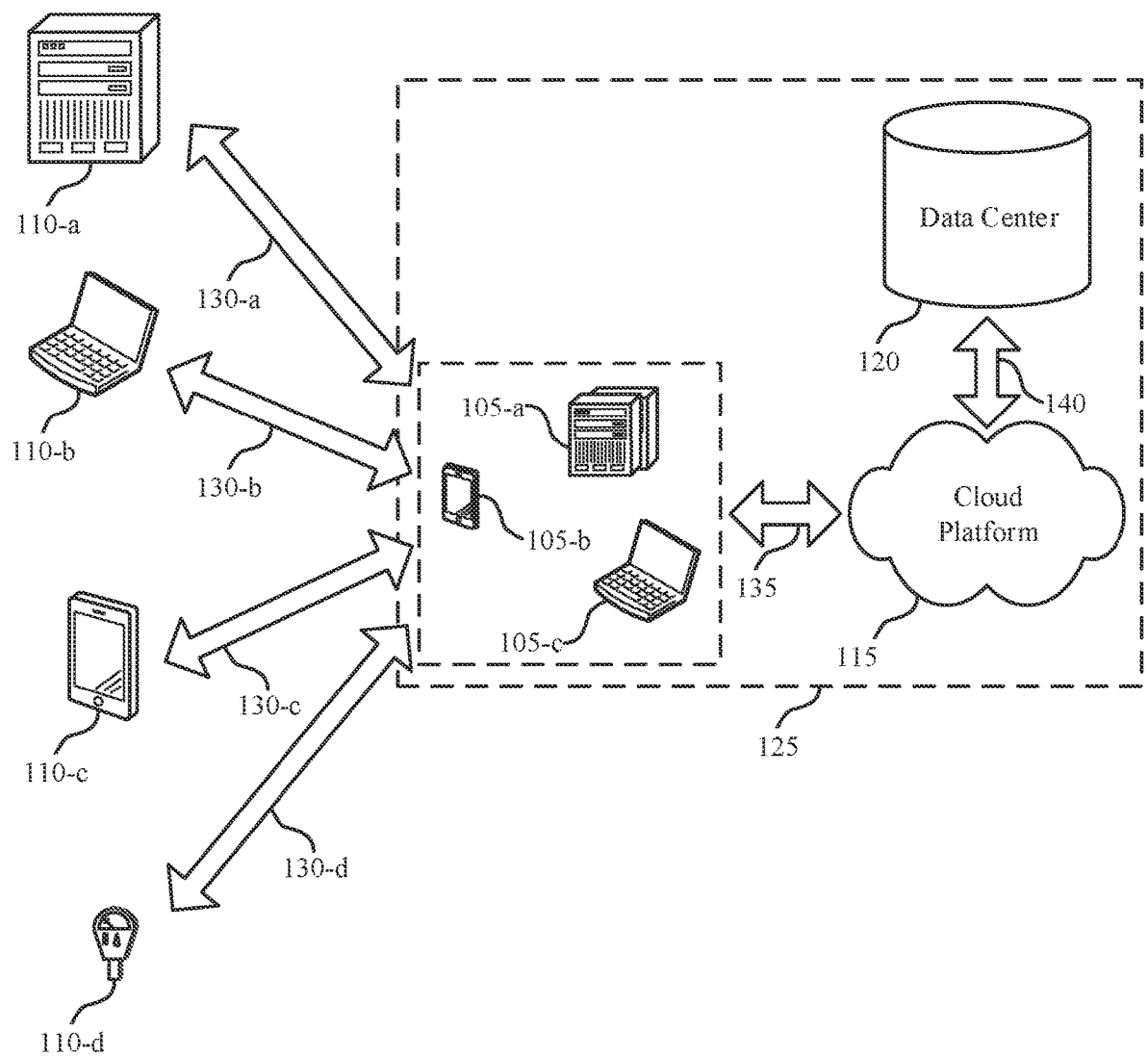
FIG. 1 illustrates an example of a provisioning a client with a digital certificate system that supports device identity based on key agreement in accordance with aspects of the present disclosure.

Cryptographic keys are used in a variety of applications, including user authentication. In some examples, a key may be used to authenticate a user to a system. If that key is compromised, then the user data may be compromised. For example, a compromised key may be used by a party to access user data via an application. Transport layer security (TLS) is a cryptographic protocol that is used to provide secure access to systems, such as an application server. The protocol is used to provide privacy and data integrity. In such systems, a server may provide a digital certificate to a client, and the digital certificate may indicate the server's public key and the certificate authority that assures the certificate, among other features. In a mutual TLS (mTLS) system, both the server and the client may exchange certificates. However, such systems are not widely used in server-client scenarios where the client is an actual user device (e.g., rather than server to server communications). In addition, mTLS may not be used because issuing certificates to client devices may involve complexities.

Techniques described herein leverage key agreement to support provisioning clients (e.g., client devices) with digital certificates. A client device may be provisioned with a partial private key. For example, a server may generate an asymmetric key pair, which includes a public key and a private key. The server may split the private key and store a first portion of the private key at the server. The second portion of the private key may be transmitted to the client device. In some cases, the second portion may be further split into sub-portions, where a first sub-portion is known to the user and a second sub-portion is stored at the device. In some examples, the private key portion provisioning process may be performed before the user takes the device. For example, an organization may provision sub-portions of private keys to devices before distributing the devices to users or employees.

To provision the clients with certificates, the server and the client may utilize key agreement protocols, such as the Elliptic-Curve Diffie-Hellman (ECDH) protocol. For example, when a client is to be provisioned with a digital certificate, the client may transmit a certificate request to the server. In response, the server may generate an ephemeral (e.g., short-lived) key pair including a public key and a private key. Using the short-lived private key, and the public key of the client (associated with the partial private key), the server may generate a shared secret (e.g., using the ECDH protocol or other key agreement protocol) and generate a symmetric key using the shared secret. The server may then encrypt a digital certificate (e.g., including the private key associated with the digital certificate) using the symmetric key. The server may also initiate the key agreement process for the client by performing partial key agreement using the partial private key stored at the server and using the public key of the ephemeral key pair. This partial key agreement result may be transmitted to the client along with the encrypted payload that includes the digital certificate and private key.

The client may use its portion of the split private key to complete the key agreement process, resulting in the shared secret (e.g., the portion of the private key is correct). The shared secret may be used to derive the symmetric key and decrypt the payload that includes the private key and digital certificate. Thereafter, the client may use the private key and digital certificate to authenticate to services, such as a service supported by an organization. For example, the digital certificate may be used to authenticate to an mTLS service.

Aspects of the disclosure are initially described in the context of an environment supporting an on-demand database service. Aspects of the disclosure are further described with respect to a general system diagram illustrating certificate provisioning, a system diagram illustrating private key provision, a system diagram illustrating the specifics of certificate provisioning, and a process flow diagram. Aspects of the disclosure are further illustrated by and described with reference to apparatus diagrams, system diagrams, and flowcharts that relate to device identity based on key agreement.

FIG. 1 illustrates an example of a system 100 for cloud computing that supports device identity based on key agreement in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, cloud platform 115 may support client authentication using an mTLS service. For example, a client (e.g., a device of cloud client 105) may request access to a service supported by the cloud platform 115. To authenticate into the service, the service may support determining whether the client has a valid access token (e.g., a JavaScript object notation (JSON) web token) before allowing access. If the client does not have a valid access token, the client may be redirected to a mTLS service, which authenticates a digital certificate of the client. Based on the authentication of the certificate by the mTLS, the client may receive a new valid access token and access the service using the token for some period of time. This process supports secure and efficient authentication, since mTLS may use certificates of the server (e.g., mTLS service) and the client. However, provisioning clients with digital certificates may involve complexities.

The cloud platform 115 may support provisioning clients with digital certificates using key agreement. A server may generate an asymmetric key pair that includes a private key and a public key. The private key may be split into two portions, and a first portion may be stored at the server. The second portion of the split private key may be shared with the client system (e.g., a device of the cloud client 105 or the contact 110). In some cases, the second portion may be further split into sub-portions, one of which may be known to the user and the other stored at the device. In some cases, the client is provisioned with the private key portion in response to the client requesting a digital certificate. In other case, the client is provisioned with the private key by an organization before the device is distributed to a user, such as an employee of the organization.

Thereafter, in response to a certificate request by a client, the server may generate, a new short-lived asymmetric key pair that includes a short-lived private key and a short-lived public key. This may be a temporary asymmetric key pair used for this particular instance of certificate provisioning. The short-lived private key and the public key associated with the client (previously generated) may be used to generate a shared secret (e.g., using ECDH protocols). The shared secret may be used to derive a symmetric key that is used to encrypt a digital certificate and a private key associated with the digital certificate (e.g., an encrypted payload). Further, the server may initiate the key agreement process for the client using the portion of the split private key that is stored at the server and the short-lived public key. A partial key agreement result, and the encrypted payload may be digitally signed (e.g., using a signing key of the server) and transmitted to the client.

The client receives the signed encrypted payload and the partial agreement result and verifies the signature (e.g., using a public key associated with the server). Upon verification, the client may complete the key agreement using the portion of the private key at the client. This may include receiving the sub-portion from the user (e.g., a pin) and using both sub-portions, as well as the public key of the client, to generate the shared secret. Because of the cryptographic protocols used to generate the asymmetric keys, the server and the client may generate the same shared secret. That is, as the server generates the shared secret using the public key of the client and the short-lived private key, and the client generates the shared secret using the private key (using partial key agreement at the server) of the device and the short-lived public key that was generated at server, the shared secrets are the same. Thus, the client may derive the same symmetric key (e.g., using the same key derivation function) and decrypt the payload to access the private key and the certificate. Thus, using this process, not a single party (e.g., client or server) stores the entire private key that is used to derive the shared secret. Since user devices (e.g., smart phones, laptops) may be subject to theft, the storage of a portion (e.g., sub-portion) of the private key may prevent unauthorized access to the server. Further, these described techniques may prevent or limit the use of passwords to access secure systems.

These techniques support providing provable device identity to the client devices. More particularly, by provisioning clients with the certificates that correspond to a chain of trust, various associated systems and services may be able to validate the device identity such as give the client access to the systems and service. For example, techniques may be used to provision a client with a certificate for mTLS authentication.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

For example, a cloud client 105 may be supported by a server of the cloud platform 115. A user (e.g., employee) may receive a device from their organization (e.g., cloud client 105). In some examples, the device may be already provisioned with a partial private key. Upon using the device, a client system of the device may transmit a certificate request to a server supported by the cloud client 105, and the server may respond with a payload that includes an encrypted payload that includes the digital certificate and associated private key. The client may request that the user input the pin and use the sub-portion of the private key corresponding to the pin and the other sub-portion that is stored at the device to complete the key agreement to generate a shared secret. The shared secret may be used to derive an encryption key to decrypt the payload. The client may then use the digital certificate and associated private key to authenticate to various systems supported by the cloud client 105. This process may be repeated periodically (e.g., certificate provisioning).

Figure 2:
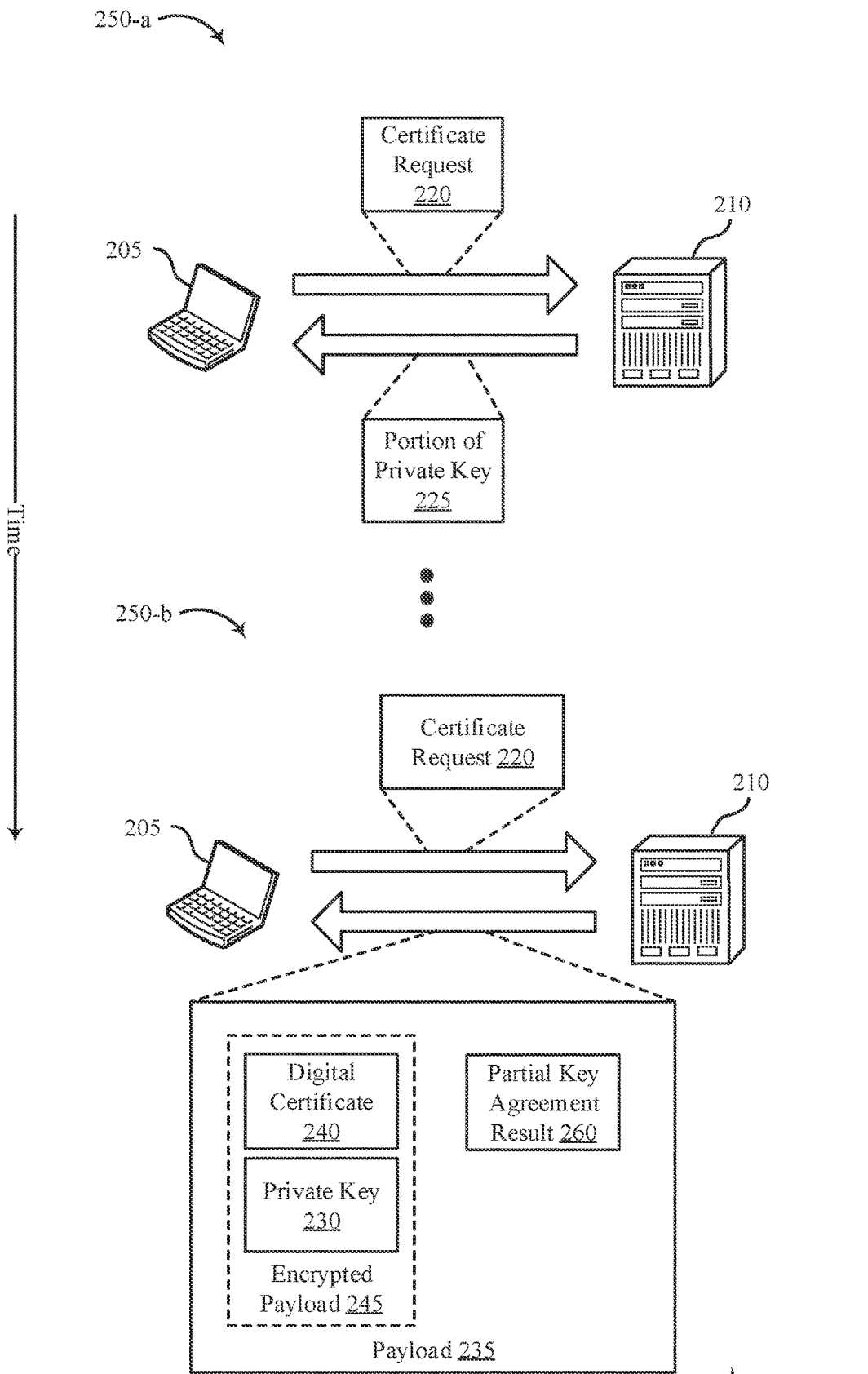
FIG. 2 illustrates an example of a system that supports device identity based on key agreement in accordance with aspects of the present disclosure.

FIG. 2 illustrates an example of a system 200 that supports device identity based on key agreement in accordance with aspects of the present disclosure. The system 200 includes a client 205 and a server 210. The server 210 may be an example of aspects of the cloud platform of FIG. 1. For example, the server 210 may be an example of an application server. The client 205 may correspond to a client device, such as a laptop, desktop, smart phone, tablet, or other type of client system. At 250-a, the client 205 may be provisioned with a portion of a private key 225. In some examples, the client 205 is provisioned with the portion of the private key in response to a certificate request 220. In other examples, the portion of the private key 225 is provisioned before the user gains access to the client 205.

To provision the client 205 with the portion of the private key 225, server 210 may generate an asymmetric key pair that includes a private key and a public key. The private key may be split into a first portion and a second portion. The first portion may be stored at the server, and the second portion of the private key 225 may be indicated to the client 205. In one example, the portion may be displayed at the device (e.g., a quick-response (QR) code may be generated and displayed, which may be scanned by the client 205). In another example, the portion of the private key 225 may be transmitted using a secure communication channel, email, text message, or the like.

The client 205 or an application of the client 205 may further split the portion of the private key 225 into sub-portions. In one example, the user of the client 205 is asked to input a pin. Based on the pin and a sub-portion, the client 205 may identify an operator/operation (addition, multiplication, etc.) that may be used, in conjunction with the pin, to generate the sub-portion. For example, a sub-portion of the portion of the private key 225 may have a value of 1000. The user may input a pin of 1234. Thus, an operator, such as (minus 234) may be identified such that input of the pin results in the portion (e.g., 1234−234=1000). The other sub-portion of the portion of the private key 225 may be securely stored at the client 205.

Subsequently, when a user wants to authenticate to the server 210 via the client 205 at 250-b, the user may open the application at the client 205. In response, an application may transmit a request to the server 210. If the client 205 does not have a valid certificate, the client 205 may be configured to transmit the certificate request 220. In response to the certificate request, the server 210 may generate a new short-lived asymmetric key pair that includes a short-lived public key and a short-lived private key. This short-lived asymmetric key pair may be an example of a one-time use key pair, as the private key may be discarded after these operations. The short-lived private key and the public key that was generated during the provisioning process may be used to generate a shared secret (e.g., using a key agreement protocol). The shared secret may be input into a key derivation function that outputs a symmetric key. The symmetric key may then be used to encrypt a digital certificate 240 and a private key 230 that is associated with the digital certificate resulting in encrypted payload 235. Thereafter, the private key may be erased.

In some examples, after the client 205 transmits the certificate request to the server 210, the server 210 may validate the client and/or generate a certificate request that is to be approved before the client 205 is provisioned with a certificate by the server 210. In some examples, the server 210 may confirm whether that the client 205 is connected to the appropriate network (e.g., a network associated with a tenant or cloud client 105 of FIG. 1), which may signal that the client 205 is authorized to receive a certificate (e.g., due to some authentication process for the network). Appropriate connection may mean that the client is connected via a virtual private network (VPN) or connected locally to the network (e.g., in the office). The server 210 may also determine whether the client 205 corresponds to a new machine or not. If the machine is not new, then the server 210 may trigger further checks or heuristics.

Further, the server 210 may identify the partial private key that corresponds to the client 205. Using the partial private key and the short-lived public key of the asymmetric key (e.g., the one-time use key), the server 210 performs a partial agreement process, which outputs a partial key agreement result 260. The encrypted payload 245 and the partial key agreement result 260 may be transmitted to the client 205 as a payload 235. In some cases, the payload 235, or some portion thereof, may be digitally signed using a signing private key of the server 210.

The client 205 receives the payload 235 and may verify the digital signature (e.g., using a signing public key of the server 210). If the payload 235 is verified, the client 205 may then prompt for the user's pin. The user may input the pin (e.g., 1234) and the client 205 may derive the corresponding sub-portion of the portion of the private key 225. For example, based on the determined operation described above, the client 205 may subtract the value 234 from the pin to derive the sub-portion of the portion of the private key 225 (e.g., 1234−234=1000). The resulting value is combined with the portion of the private key that is stored at the client, which results in the portion of the private key 225. The portion of the private key 225 is used to complete the key agreement process using the partial key agreement result 260. This may result in the shared secret that was derived by the server using the client public key and the server private key. Thus, this shared secret is input into a key derivation function to derive the symmetric key that may be used to decrypt the encrypted payload 245. The client 205 may then use the digital certificate 240 and the private key 230 to authenticate to various systems.

Figure 3:
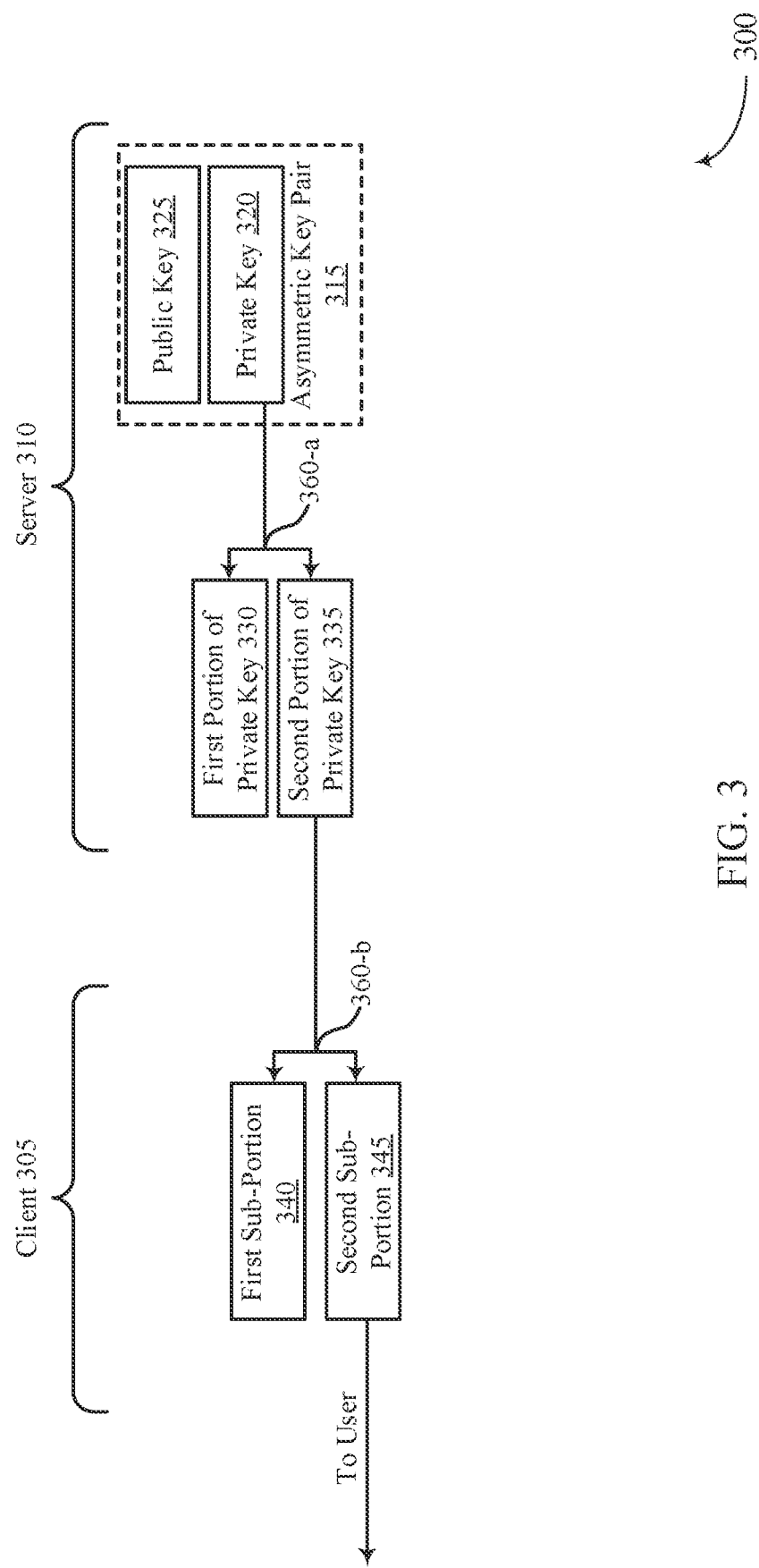
FIG. 3 illustrates an example of a system that supports device identity based on key agreement in accordance with aspects of the present disclosure.

FIG. 3 illustrates an example of a system 300 that supports device identity based on key agreement in accordance with aspects of the present disclosure. The system 300 includes a client 305 and a server 310, which may be examples of the corresponding devices as described with respect to FIGS. 1 and 2. Specifically, the system 300 illustrates a partial private key provisioning process that supports digital certificate provisioning using key agreement in accordance with implementations described herein.

The server 310 may generate an asymmetric key pair 315 that includes a public key 325 and a private key 320. In some examples, the asymmetric key pair generation and subsequent private key portion provisioning is performed as a result of a certificate request by the client 305. In other cases, the asymmetric key pair generation and subsequent private key portion provisioning is performed before a certificate request (e.g., before the client device is accessed by the user). In some cases, the asymmetric key pair 315 is generated using elliptic curve cryptography principles, and the key pair 315 may be referred to as an elliptic curve key pair.

The server 310 may include a hardware security module (HSM). The HSM may be an example of a physical secure hardware system, such as a chipset, or a logical or virtual security system. The HSM may support digital key derivation, encryption, decryption, digital signatures, authentication, and other cryptographic functions.

The server 310 (e.g., the HSM of the server) may split the private key 320 using a key splitting function at 360-$a$. The key may be split in accordance with multi-party computation principles. They key splitting may result in a first portion of the private key 330 and a second portion of the private key 335, which is transmitted to the client 305. The first portion of the private key 330 may be securely stored at a data store of the server 310. The key splitting and distribution may be referred to secret sharing, in some examples. Various types of secure secret sharing protocols and algorithms may be used.

Transmission of the second portion of the private key 335 to the client 305 may be supported using various techniques. In accordance with one technique, a QR code may be displayed at or by a computing display. A user may scan or read the QR code using the mobile device. In another case, the second portion of the private key 335 is transmitted to the application over a secure channel, transmitted via email, text message, or the like. Various other techniques for transmitting to the second portion of the private key 335 are contemplated within the scope of this disclosure.

At the client 305, in some examples, the second portion of the private key 335 may be stored in memory for subsequent authentication. In other examples, as illustrated in FIG. 3, the second portion of the private key 335 is further split, using a key splitting function 360-$b$, into two sub portions, including a first sub-portion 340 and a second sub portion 345. This splitting process may include displaying a portion (e.g., a pin) to the user, and the pin may correspond to the second sub-portion 345. In other cases, the user is prompted to enter a pin, and an operator/operation is generated based on the entered pin. Thereafter, the user may enter the pin and the client may perform the operation, which may result in the second sub-portion 345. The first sub-portion 340 may be securely stored at the client 305 in association with the application. Thus, the second portion of the private key 335 may be distributed amongst the device and the user, which may further enhance security in the implementations described herein. Thereafter, during a certificate provisioning process, the second portion of the private key 335 may be utilized by the client 305 to complete a key agreement process and decrypt the digital certificate using a derived symmetric key. This process is further described with respect to FIG. 4.

Figure 4:
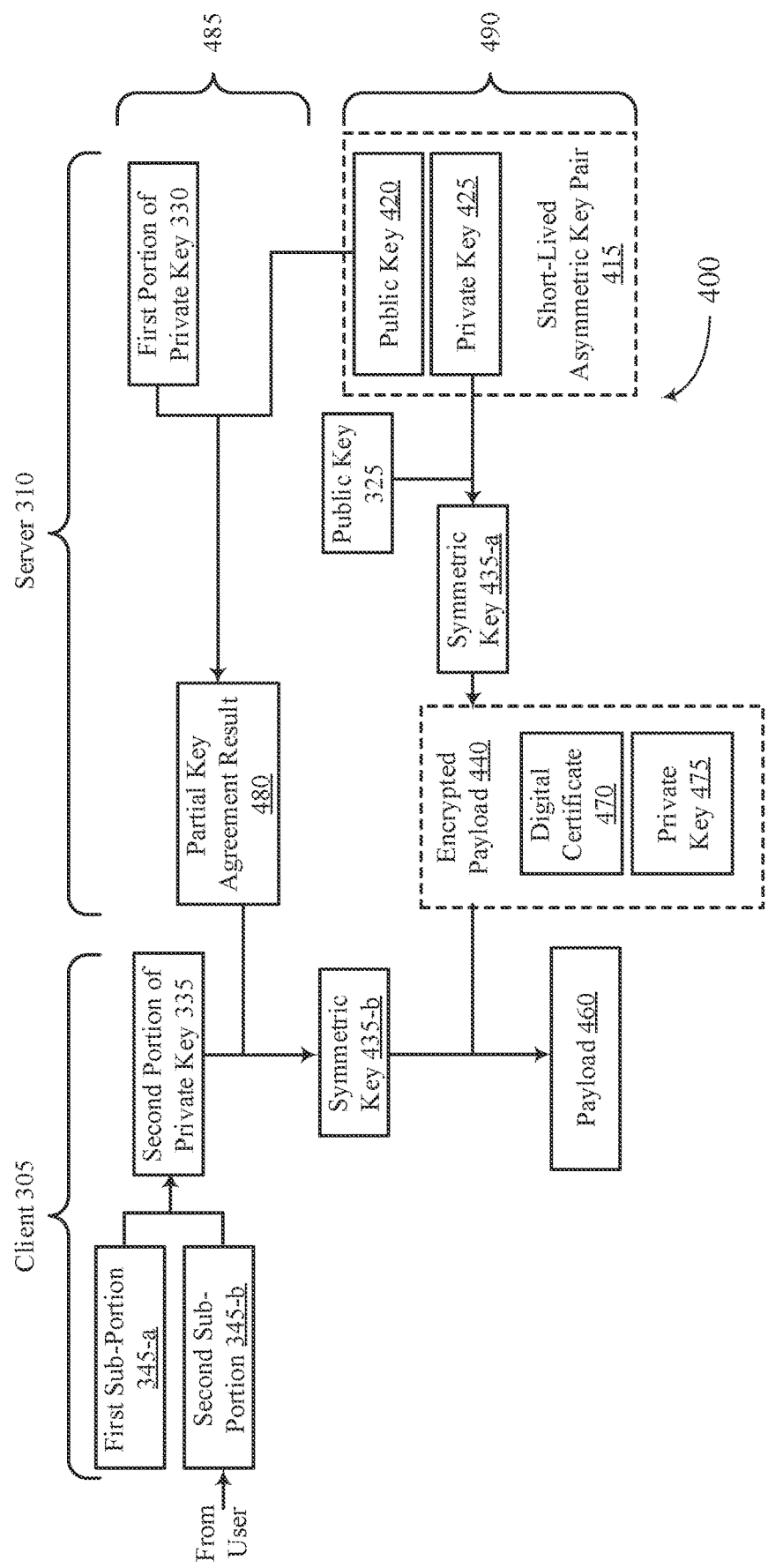
FIG. 4 illustrates an example of a system that supports device identity based on key agreement in accordance with aspects of the present disclosure.

FIG. 4 illustrates an example of a system 400 that supports device identity based on key agreement in accordance with aspects of the present disclosure. The system 400 includes a client 305 and a server 310, which may be examples of the corresponding devices as described with respect to FIGS. 1 through 3. As illustrated in FIG. 3, the client 305 is provisioned with a second portion of a private key 335, while a first portion of the private key 330 is stored at the server 310. In FIG. 4, the authentication process is illustrated.

A client 305 may attempt to access a service supported by the server 310 or associated with the server 310. If the client 305 does not have a valid certificate, then the client 305 may transmit a certificate request to the server 310. In some examples, the service that the client is attempting to access may redirect the client 305 to the server 310 for requesting the certificate. In response to the certificate request, the server performs a first process 485 and a second process 490. The server may generate short-lived asymmetric key pair 415 in response to the certificate request. The short-lived asymmetric key pair 415 includes a public key 420 (e.g., short-lived public key) and a private key 425 (e.g., short-lived private key). This asymmetric key pair may be a temporary (e.g., ephemeral) key pair, as it may be used for this particular certificate provisioning instance. As such, when the user subsequently performs a certificate request (e.g., upon expiration of a prior certificate), another short-lived asymmetric key pair 415 may be generated. Further, since the short-lived private key 425 is erased after utilization, the public key 420 may not be used for any authentication purposes. In accordance with the first process 485, the server 310 begins a key agreement process that is to be completed by the client. Using the first portion of the private key 330 that is stored at the server, and the public key 420 (e.g., a public key that is associated with the private key 425), the server 310 performs key agreement (e.g., using an ECDH protocol), which may result in a partial key agreement result 480. At this point, the partial key agreement result 480 may not be utilized for any authentication purposes since the second portion of the private key 335 is stored at the client 305 and has not been used to complete the key agreement process.

In accordance with the second process 490, the private key 425 of the asymmetric key pair and a public key 325 are used to generate a shared secret, then derive a symmetric key 435-$a$ based on the shared secret. It should be noted that the public key 325 is the public key that is associated with the private key 320 of FIG. 3 that was split into the first portion of the private key 330 and the second portion of the private key 335 during the client provisioning process of FIG. 3. The derived symmetric key 435-$a$ is used to encrypt a payload resulting in encrypted payload 440. The private key 425 may be erased from memory of the server. The encrypted payload 440 may include a digital certificate 470 and a private key 475 associated with the digital certificate 470. The digital certificate 470 may be an example of a certificate chain that includes a series of certificates that starts with the certificate of the server 310 and end with a root certificate (e.g., a root certificate associated with the certificate authority that issued the certificate). Thus, the digital certificate 470 establishes a chain of trust from the client (e.g., once the client possesses the digital certificate 470) to the certificate authority. In some examples, the server 310 may utilize a third party certificate authority to generate the certificate. In other cases, the server 310 may support or may be associated with an internal certificate authority for certificate generation. In either case, the server 310 has established a chain of trust with the certificate authority.

The result of the first process 485, which is the partial key agreement result 480, and the result of the second process 490, which is the encrypted payload 440 may be transmitted to the client 305 as part of a payload (e.g., a payload 235 of FIG. 2). In some cases, the payload, or some portion thereof, may be digitally signed using a signing private key associated with the server 310.

The client 305 receives the payload. In some cases, the client 305 may verify the digital signature of the payload using a signing public key of the server, 310 which may be typically included in a digital certificate. Further, if the second portion of the private key 335 is split into sub-portions 345-$a$ and 345-$b$, the client 305 may prompt for the second sub-portion (or a corresponding pin) from the user. Using the first sub-portion 345-$a$ and the second sub-portion 345-$b$, the client 305 may generate the second portion of the private key 335. Using the partial key agreement result 480 and the second portion of the private key 335, the client 305 performs or completes the key agreement process, which may result in a shared secret (which may be the same shared secret used to derive the symmetric key 435-$a$ at the server according to key agreement protocols). Using the shared secret, the client 305 may derive the symmetric key 435-$b$, which may be the same symmetric key 435-$a$. Thus, the client may decrypt the encrypted payload 440 using the symmetric key 435-$b$, resulting in payload 460. Thus, the client 305 may access the digital certificate 470 and the associated private key 475 for subsequent operations, including mTLS authentication to various services.

The key derivation function (KDF) that is used to derive the symmetric key 435 may be agreed upon between the client 305 and the server 310. The KDF may be one of many key derivation functions. For example, the KDF may be an example of an advanced encryption standard (AES) function, a Galois/Counter mode (GCM) protocol, or the like.

Figure 5:
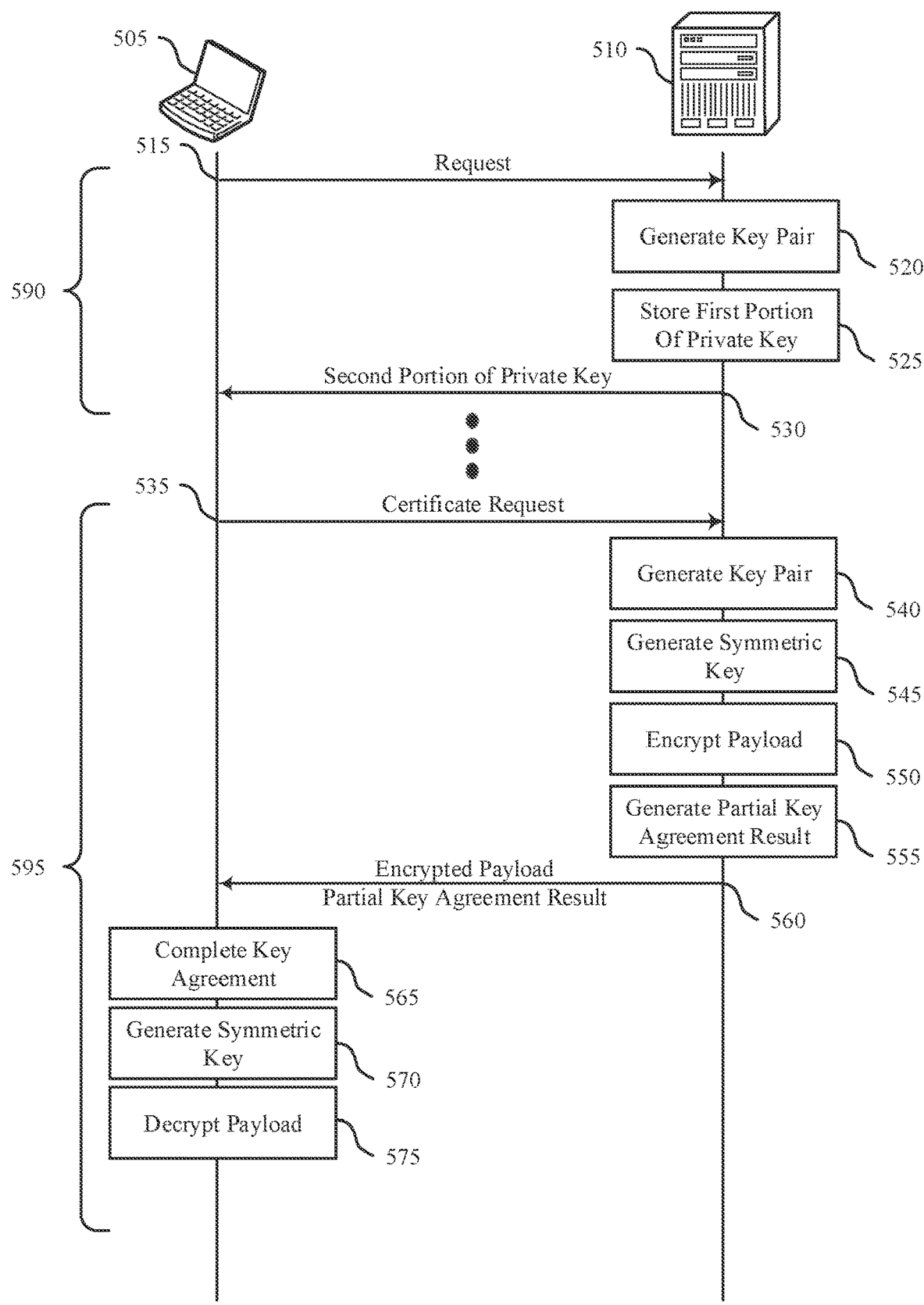
FIG. 5 illustrates an example of a process flow diagram that illustrates device identity based on key agreement in accordance with aspects of the present disclosure.

FIG. 5 illustrates an example of a process flow diagram 500 that illustrates device identity based on key agreement in accordance with aspects of the present disclosure. The process flow diagram includes a client 505 and a server 510, which may be examples of the corresponding devices as described with respect to FIGS. 1 through 4.

At 515, the client 505 may transit a request to the server. In some examples, the request may be an example of certificate request, as described at 535.

At 520, the server 510 may generate an asymmetric key pair that includes a public key and a private key. The public key may be stored at the server 510.

At 525, the server 510 may store a first portion of the private key. That is, the server 510 may split the private key into a first portion and a second portion using multi-party computation principles.

At 530, the server 510 may transmit a second portion of the private key to the client 505. Operations at 515, 520, and 525 may correspond to a private key portion provisioning process 590. In some examples, the private key portion provisioning process may be performed before a request or before a user receives the device. More particularly, the client 505 may be provisioned with the private key portion before the user receives the device.

Subsequently, at 535, the server 510 may receive, from the client 505, a certificate request. The certificate request may be an example of the request at 515. That is, the server 510 may perform the private key portion provisioning process 590 and a certificate provisioning process 595 in response to a certificate request. In some cases the certificate request may be transmitted by the client 505 in response to a failure to present a valid certificate to a service supported by the server 510 or associated with the server 510. For example, the client 505 is redirected to the server for certificate provisioning upon failure to authenticate to a service.

At 540, the server 510 may generate, in response to receiving the certificate request, a short-lived asymmetric key pair. The asymmetric key pair may be generated using an elliptic curve process.

At 545, the server 510 may generate, based at least in part on receiving the certificate request, a symmetric key using the client public key and a short-lived private key of the short-lived asymmetric key pair. To generate the symmetric key, the server 510 may perform a key agreement process that may result in a shared secret, and the shared secret may be used to derive the symmetric key.

At 550, the server 510 may encrypt a payload using the generated symmetric key. The payload may include a digital certificate and an associated private key. The digital certificate may be generated by a certificate authority associated with the server 510, by a certificate service supported by the server 510, or the like. The digital certificate may be an example of a certificate chain that establishes a chain of trust between the server 510 and the certificate authority.

At 555, the server 510 may generate a partial key agreement result using a first portion of a split private key. The partial key agreement result may also utilize the short-lived public key that was generated at the server. The key agreement process may be based on the ECDH protocol At 560, the server 510 may transmit the encrypted payload and the partial key agreement result to the client 505.

At 565, the client 505 may complete the key agreement process using the second portion of the private key and the key agreement result. Completion of the key agreement may also utilize the public key that was generated during the client provisioning process. In some examples, before completing the key agreement, the client 505 may verify a digital signature of the server 510.

At 570, the client 505 may generate the symmetric key based on shared secret that is the result of completing the key agreement at 565. The symmetric key may be generated using a key derivation function.

At 575, the client 505 may decrypt the payload that is received from the server 510 using the derived symmetric key to access the digital certificate and the private key. The client 505 may store digital certificate and/or the private key in a secure enclave of the client 505. The private key and the digital certificate may be used for subsequent operations. In some examples, the private key and the digital certificate are used for authentication at the server 510 or at another service or system. In some cases, the private key and the digital certificate may be used for mTLS for authentication.

Figure 6:
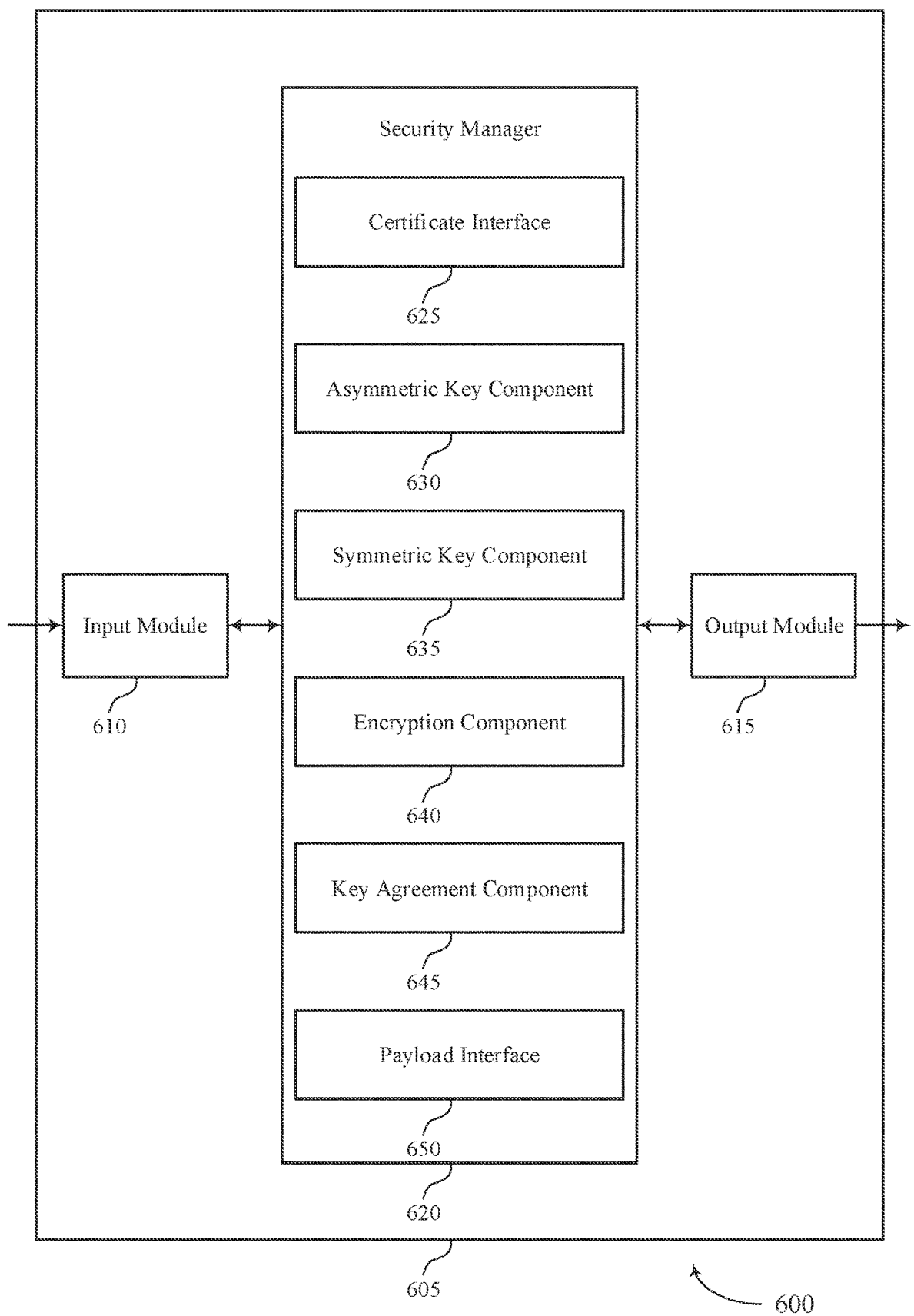
FIG. 6 shows a block diagram of an apparatus that supports device identity based on key agreement in accordance with aspects of the present disclosure.

FIG. 6 shows a block diagram 600 of a device 605 that supports device identity based on key agreement in accordance with aspects of the present disclosure. The device 605 may include an input module 610, an output module 615, and a security manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the security manager 620 to support device identity based on key agreement. In some cases, the input module 610 may be a component of an I/O controller 810 as described with reference to FIG. 8.

The output module 615 may manage output signals for the device 605. For example, the output module 615 may receive signals from other components of the device 605, such as the security manager 620, and may transmit these signals to other components or devices. In some specific examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the security manager 620 may include a certificate interface 625, an asymmetric key component 630, a symmetric key component 635, an encryption component 640, a key agreement component 645, a payload interface 650, or any combination thereof. In some examples, the security manager 620, or various components thereof, may be configured to perform various operations (e.g., receiving, monitoring, transmitting) using or otherwise in cooperation with the input module 610, the output module 615, or both. For example, the security manager 620 may receive information from the input module 610, send information to the output module 615, or be integrated in combination with the input module 610, the output module 615, or both to receive information, transmit information, or perform various other operations as described herein.

The security manager 620 may support provisioning a client with a digital certificate in accordance with examples as disclosed herein. The certificate interface 625 may be configured as or otherwise support a means for receiving, at a server and from the client, a certificate request, the client being associated with a client public key. The asymmetric key component 630 may be configured as or otherwise support a means for generating, by the server, in response to receiving the certificate request, a short-lived asymmetric key pair. The symmetric key component 635 may be configured as or otherwise support a means for generating, by the server, a symmetric key using the client public key and a short-lived private key of the short-lived asymmetric key pair. The encryption component 640 may be configured as or otherwise support a means for encrypting a payload that includes the digital certificate and a new private key associated with the digital certificate using the symmetric key. The key agreement component 645 may be configured as or otherwise support a means for generating a partial key agreement result using a first portion of a split private key, the server having transmitted a second portion of the split private key to the client, the split private key being associated with the client public key. The payload interface 650 may be configured as or otherwise support a means for transmitting the encrypted payload and the partial key agreement result to the client, wherein the client is configured to derive the symmetric key for decrypting the payload using the partial key agreement result.

Figure 7:
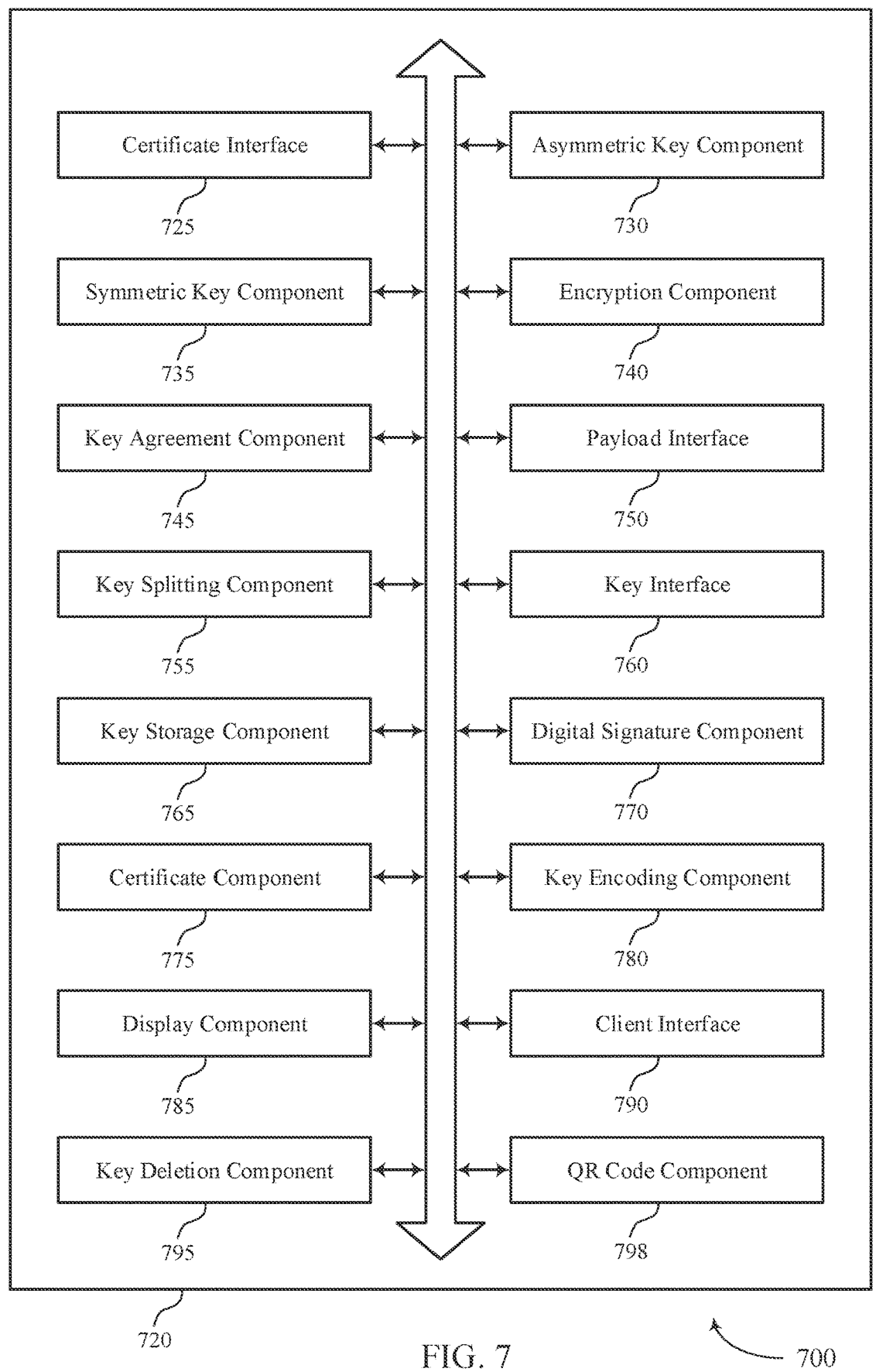
FIG. 7 shows a block diagram of a security manager that supports device identity based on key agreement in accordance with aspects of the present disclosure.

FIG. 7 shows a block diagram 700 of a security manager 720 that supports device identity based on key agreement in accordance with aspects of the present disclosure. The security manager 720 may be an example of aspects of a security manager 820 or a security manager 620, or both, as described herein. The security manager 720, or various components thereof, may be an example of means for performing various aspects of device identity based on key agreement as described herein. For example, the security manager 720 may include a certificate interface 725, an asymmetric key component 730, a symmetric key component 735, an encryption component 740, a key agreement component 745, a payload interface 750, a key splitting component 755, a key interface 760, a key storage component 765, a digital signature component 770, a certificate component 775, a key encoding component 780, a display component 785, a client interface 790, a key deletion component 795, a QR code component 798, or any combination thereof. Each of these components may communicate, directly or indirectly, with one another (e.g., via one or more buses).

The security manager 720 may support provisioning a client with a digital certificate in accordance with examples as disclosed herein. The certificate interface 725 may be configured as or otherwise support a means for receiving, at a server and from the client, a certificate request, the client being associated with a client public key. The asymmetric key component 730 may be configured as or otherwise support a means for generating, by the server, in response to receiving the certificate request, a short-lived asymmetric key pair. The symmetric key component 735 may be configured as or otherwise support a means for generating, by the server, a symmetric key using the client public key and a short-lived private key of the short-lived asymmetric key pair. The encryption component 740 may be configured as or otherwise support a means for encrypting a payload that includes the digital certificate and a new private key associated with the digital certificate using the symmetric key. The key agreement component 745 may be configured as or otherwise support a means for generating a partial key agreement result using a first portion of a split private key, the server having transmitted a second portion of the split private key to the client, the split private key being associated with the client public key. The payload interface 750 may be configured as or otherwise support a means for transmitting the encrypted payload and the partial key agreement result to the client, wherein the client is configured to derive the symmetric key for decrypting the payload using the partial key agreement result.

In some examples, the asymmetric key component 730 may be configured as or otherwise support a means for generating a first key pair including the client public key and a private key based at least in part on receiving the certificate request. In some examples, the key splitting component 755 may be configured as or otherwise support a means for generating, based at least in part on the private key, the split private key including the first portion of the split private key and the second portion of the split private key. In some examples, the key interface 760 may be configured as or otherwise support a means for transmitting, to the client, an indication of the second portion of the split private key, wherein the server is configured to receive the certificate request from the client based at least in part on transmitting the indication of the second portion of the split private key to the client.

In some examples, to support transmitting the indication of the first portion of the split private key, the key encoding component 780 may be configured as or otherwise support a means for generating an encoded version of the second portion of the split private key. In some examples, to support transmitting the indication of the first portion of the split private key, the display component 785 may be configured as or otherwise support a means for causing display of the encoded version of the first portion of the split private key on a user interface of a computing device.

In some examples, to support generating the encoded version of the first portion of the split private key, the QR code component 798 may be configured as or otherwise support a means for generating a QR code, wherein the QR code is displayed to a user on the user interface.

In some examples, to support transmitting the indication of the first portion of the split private key, the client interface 790 may be configured as or otherwise support a means for causing a first sub portion of the second portion of the split private key to be stored at the client. In some examples, to support transmitting the indication of the first portion of the split private key, the client interface 790 may be configured as or otherwise support a means for causing display of a second sub portion of the split private key to be displayed by a user interface of the client.

In some examples, the key storage component 765 may be configured as or otherwise support a means for storing the first portion of the split private key in association with the client public key.

In some examples, the asymmetric key component 730 may be configured as or otherwise support a means for generating an elliptic curve key pair as the short-lived asymmetric key pair including the short-lived private key and a short-lived public key based at least in part on receiving the certificate request. In some examples, the asymmetric key component 730 may be configured as or otherwise support a means for generating the symmetric key using the short-lived private key and the client public key, wherein the partial key agreement result is generated using the first portion of the split private key and the short-lived public key such that the client is able to derive the symmetric key using the second portion of the split private key and the short-lived public key of the short-lived asymmetric key pair.

In some examples, the key deletion component 795 may be configured as or otherwise support a means for erasing the short-lived private key from memory in response to generating the symmetric key using the short-lived private key, the erasing resulting in the respective short-lived private key being a one-time use key.

In some examples, the digital signature component 770 may be configured as or otherwise support a means for generating a digital signature of the encrypted payload using a server signing private key such that the client is able to verify the encrypted payload using a server signing public key.

In some examples, the certificate component 775 may be configured as or otherwise support a means for receiving the digital certificate from a trusted certificate authority based at least in part on receiving the certificate request.

In some examples, the certificate component 775 may be configured as or otherwise support a means for generating, by the service, the digital certificate based at least in part on receiving the certificate request.

Figure 8:
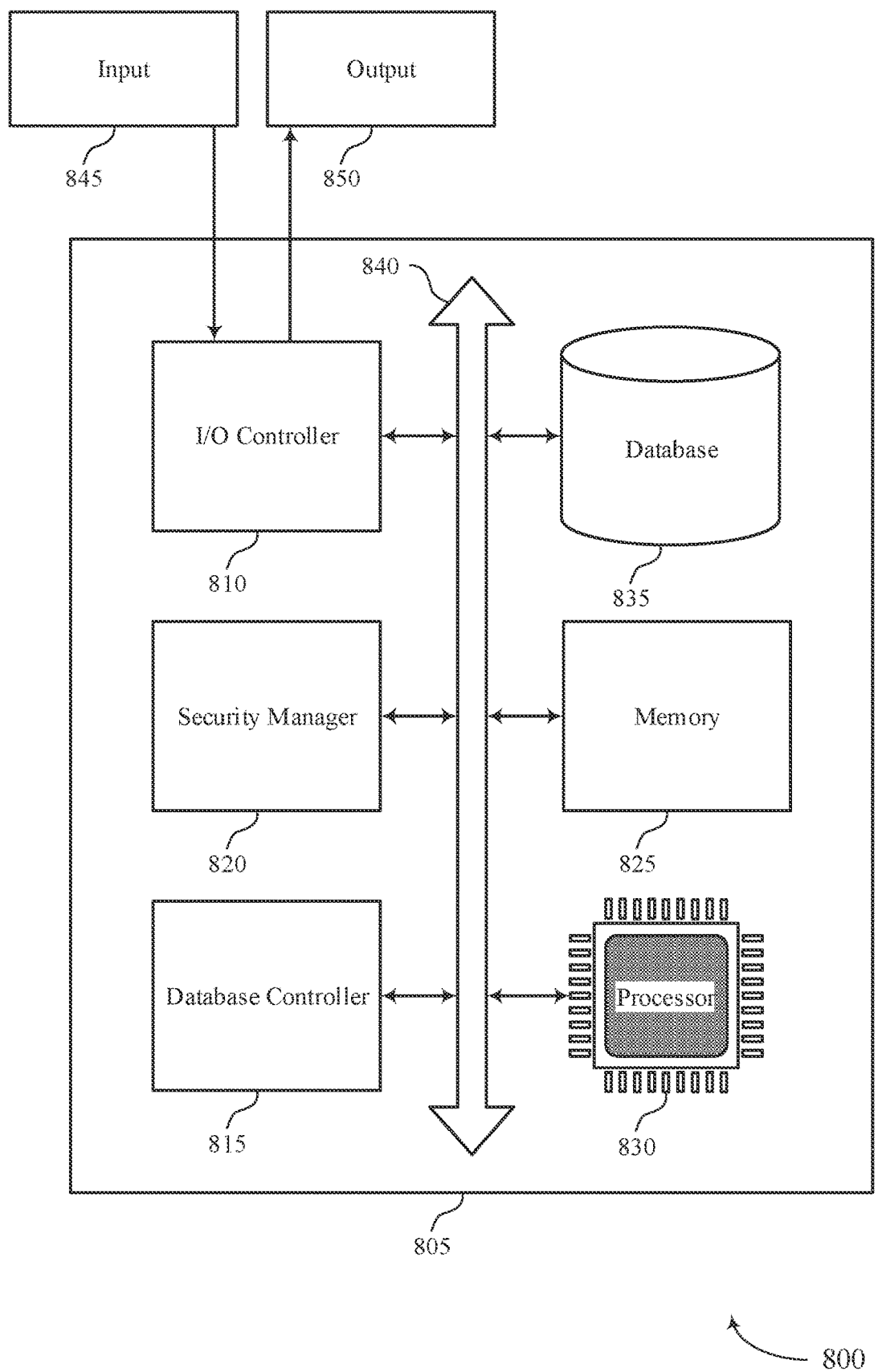
FIG. 8 shows a diagram of a system including a device that supports device identity based on key agreement in accordance with aspects of the present disclosure.

FIG. 8 shows a diagram of a system 800 including a device 805 that supports device identity based on key agreement in accordance with aspects of the present disclosure. The device 805 may be an example of or include the components of a device 605 as described herein. The device 805 may include components for bi-directional data communications including components for transmitting and receiving communications, such as a security manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor. In some cases, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting device identity based on key agreement).

The security manager 820 may support provisioning a client with a digital certificate in accordance with examples as disclosed herein. For example, the security manager 820 may be configured as or otherwise support a means for receiving, at a server and from the client, a certificate request, the client being associated with a client public key. The security manager 820 may be configured as or otherwise support a means for generating, by the server, in response to receiving the certificate request, a short-lived asymmetric key pair. The security manager 820 may be configured as or otherwise support a means for generating, by the server, a symmetric key using the client public key and a short-lived private key of the short-lived asymmetric key pair. The security manager 820 may be configured as or otherwise support a means for encrypting a payload that includes the digital certificate and a new private key associated with the digital certificate using the symmetric key. The security manager 820 may be configured as or otherwise support a means for generating a partial key agreement result using a first portion of a split private key, the server having transmitted a second portion of the split private key to the client, the split private key being associated with the client public key. The security manager 820 may be configured as or otherwise support a means for transmitting the encrypted payload and the partial key agreement result to the client, wherein the client is configured to derive the symmetric key for decrypting the payload using the partial key agreement result.

Figure 9:
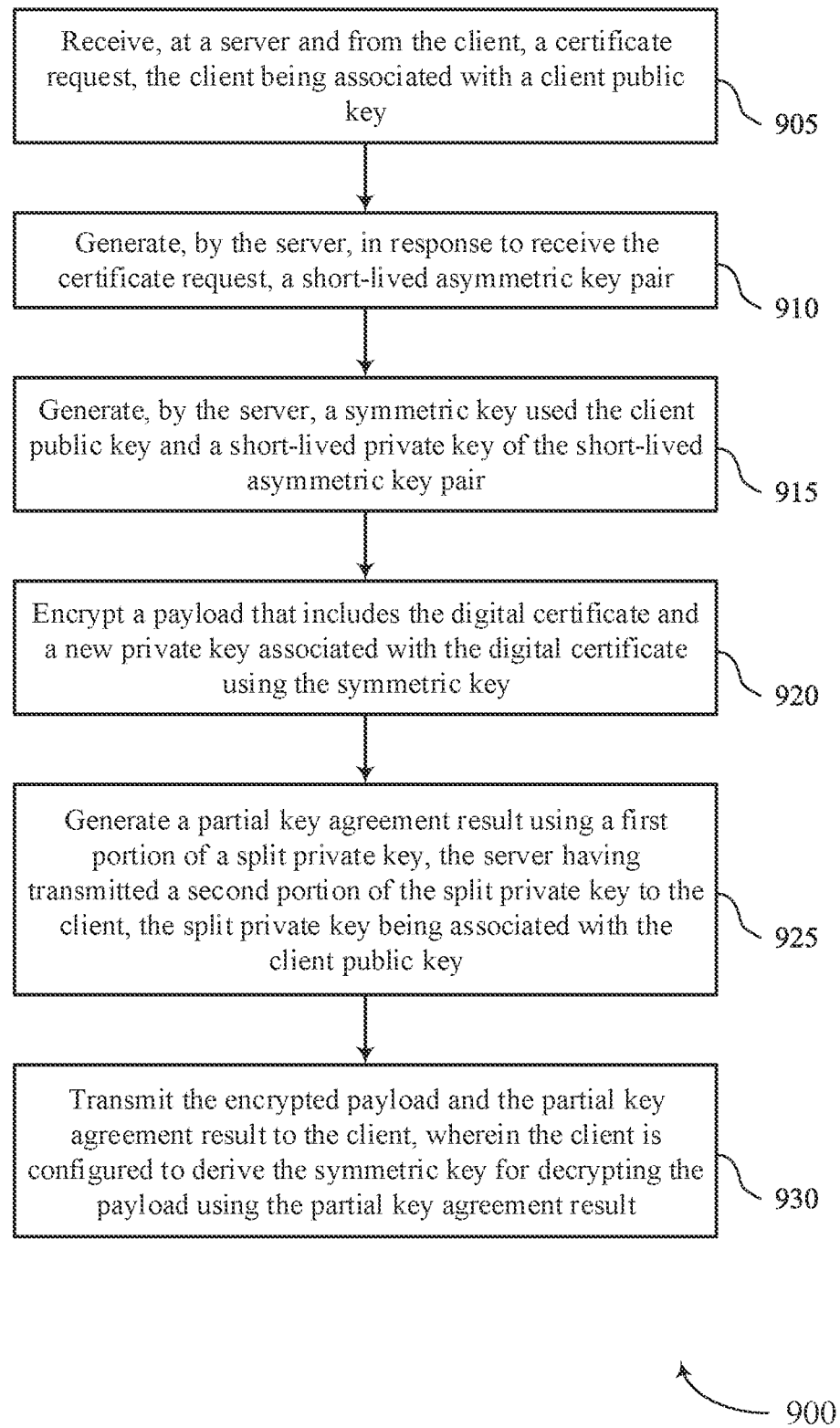
FIGS. 9 and 10 show flowcharts illustrating methods that support device identity based on key agreement in accordance with aspects of the present disclosure.

FIG. 9 shows a flowchart illustrating a method 900 that supports device identity based on key agreement in accordance with aspects of the present disclosure. The operations of the method 900 may be implemented by a server or its components as described herein. For example, the operations of the method 900 may be performed by a server as described with reference to FIGS. 6 through 8. In some examples, a server may execute a set of instructions to control the functional elements of the server to perform the described functions. Additionally or alternatively, the server may perform aspects of the described functions using special-purpose hardware.

At 905, the method may include receiving, at a server and from the client, a certificate request, the client being associated with a client public key. The operations of 905 may be performed in accordance with examples as disclosed herein. In some examples, aspects of the operations of 905 may be performed by a certificate interface 725 as described with reference to FIG. 7.

At 910, the method may include generating, by the server, in response to receiving the certificate request, a short-lived asymmetric key pair. The operations of 910 may be performed in accordance with examples as disclosed herein. In some examples, aspects of the operations of 910 may be performed by an asymmetric key component 730 as described with reference to FIG. 7.

At 915, the method may include generating, by the server, a symmetric key using the client public key and a short-lived private key of the short-lived asymmetric key pair. The operations of 915 may be performed in accordance with examples as disclosed herein. In some examples, aspects of the operations of 915 may be performed by a symmetric key component 735 as described with reference to FIG. 7.

At 920, the method may include encrypting a payload that includes the digital certificate and a new private key associated with the digital certificate using the symmetric key. The operations of 920 may be performed in accordance with examples as disclosed herein. In some examples, aspects of the operations of 920 may be performed by an encryption component 740 as described with reference to FIG. 7.

At 925, the method may include generating a partial key agreement result using a first portion of a split private key, the server having transmitted a second portion of the split private key to the client, the split private key being associated with the client public key. The operations of 925 may be performed in accordance with examples as disclosed herein. In some examples, aspects of the operations of 925 may be performed by a key agreement component 745 as described with reference to FIG. 7.

At 930, the method may include transmitting the encrypted payload and the partial key agreement result to the client, wherein the client is configured to derive the symmetric key for decrypting the payload using the partial key agreement result. The operations of 930 may be performed in accordance with examples as disclosed herein. In some examples, aspects of the operations of 930 may be performed by a payload interface 750 as described with reference to FIG. 7.

Figure 10:
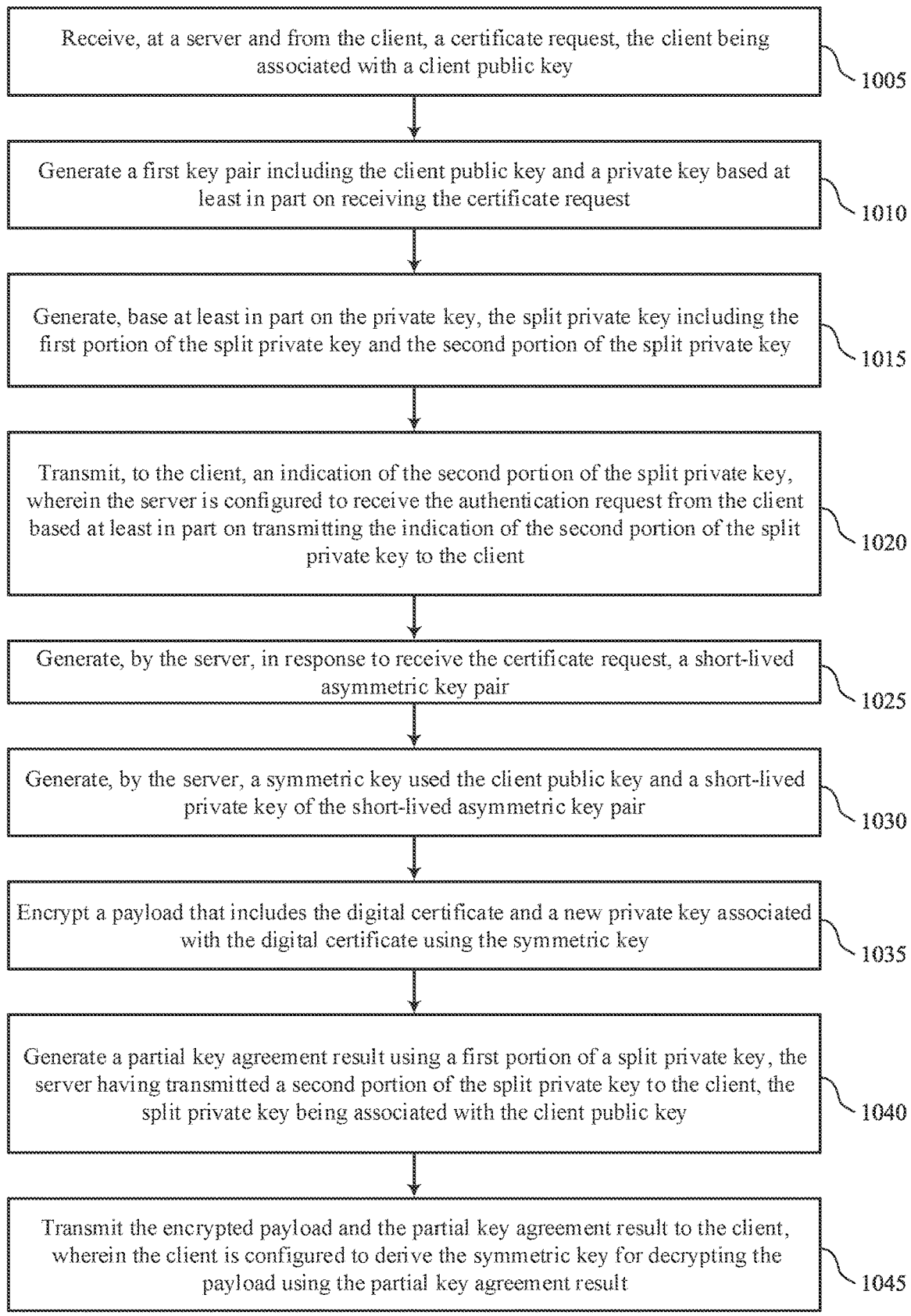

FIG. 10 shows a flowchart illustrating a method 1000 that supports device identity based on key agreement in accordance with aspects of the present disclosure. The operations of the method 1000 may be implemented by a server or its components as described herein. For example, the operations of the method 1000 may be performed by a server as described with reference to FIGS. 6 through 8. In some examples, a server may execute a set of instructions to control the functional elements of the server to perform the described functions. Additionally or alternatively, the server may perform aspects of the described functions using special-purpose hardware.

At 1005, the method may include receiving, at a server and from the client, a certificate request, the client being associated with a client public key. The operations of 1005 may be performed in accordance with examples as disclosed herein. In some examples, aspects of the operations of 1005 may be performed by a certificate interface 725 as described with reference to FIG. 7.

At 1010, the method may include generating a first key pair including the client public key and a private key based at least in part on receiving the certificate request. The operations of 1010 may be performed in accordance with examples as disclosed herein. In some examples, aspects of the operations of 1010 may be performed by an asymmetric key component 730 as described with reference to FIG. 7.

At 1015, the method may include generating, based at least in part on the private key, the split private key including the first portion of the split private key and the second portion of the split private key. The operations of 1015 may be performed in accordance with examples as disclosed herein. In some examples, aspects of the operations of 1015 may be performed by a key splitting component 755 as described with reference to FIG. 7.

At 1020, the method may include transmitting, to the client, an indication of the second portion of the split private key, wherein the server is configured to receive the certificate request from the client based at least in part on transmitting the indication of the second portion of the split private key to the client. The operations of 1020 may be performed in accordance with examples as disclosed herein. In some examples, aspects of the operations of 1020 may be performed by a key interface 760 as described with reference to FIG. 7.

At 1025, the method may include generating, by the server, in response to receiving the certificate request, a short-lived asymmetric key pair. The operations of 1025 may be performed in accordance with examples as disclosed herein. In some examples, aspects of the operations of 1025 may be performed by an asymmetric key component 730 as described with reference to FIG. 7.

At 1030, the method may include generating, by the server, a symmetric key using the client public key and a short-lived private key of the short-lived asymmetric key pair. The operations of 1030 may be performed in accordance with examples as disclosed herein. In some examples, aspects of the operations of 1030 may be performed by a symmetric key component 735 as described with reference to FIG. 7.

At 1035, the method may include encrypting a payload that includes the digital certificate and a new private key associated with the digital certificate using the symmetric key. The operations of 1035 may be performed in accordance with examples as disclosed herein. In some examples, aspects of the operations of 1035 may be performed by an encryption component 740 as described with reference to FIG. 7.

At 1040, the method may include generating a partial key agreement result using a first portion of a split private key, the server having transmitted a second portion of the split private key to the client, the split private key being associated with the client public key. The operations of 1040 may be performed in accordance with examples as disclosed herein. In some examples, aspects of the operations of 1040 may be performed by a key agreement component 745 as described with reference to FIG. 7.

At 1045, the method may include transmitting the encrypted payload and the partial key agreement result to the client, wherein the client is configured to derive the symmetric key for decrypting the payload using the partial key agreement result. The operations of 1045 may be performed in accordance with examples as disclosed herein. In some examples, aspects of the operations of 1045 may be performed by a payload interface 750 as described with reference to FIG. 7.

It should be noted that the methods described above describe possible implementations, and that the operations and the steps may be rearranged or otherwise modified and that other implementations are possible. Furthermore, aspects from two or more of the methods may be combined.

A method for provisioning a client with a digital certificate is described. The method may include receiving, at a server and from the client, a certificate request, the client being associated with a client public key, generating, by the server, in response to receiving the certificate request, a short-lived asymmetric key pair, generating, by the server, a symmetric key using the client public key and a short-lived private key of the short-lived asymmetric key pair, encrypting a payload that includes the digital certificate and a new private key associated with the digital certificate using the symmetric key, generating a partial key agreement result using a first portion of a split private key, the server having transmitted a second portion of the split private key to the client, the split private key being associated with the client public key, and transmitting the encrypted payload and the partial key agreement result to the client, wherein the client is configured to derive the symmetric key for decrypting the payload using the partial key agreement result.

An apparatus for provisioning a client with a digital certificate is described. The apparatus may include a processor, memory in electronic communication with the processor, and instructions stored in the memory. The instructions may be executable by the processor to cause the apparatus to receive, at a server and from the client, a certificate request, the client being associated with a client public key, generating, by the server, in response to receive the certificate request, a short-lived asymmetric key pair, generating, by the server, a symmetric key used the client public key and a short-lived private key of the short-lived asymmetric key pair, encrypt a payload that includes the digital certificate and a new private key associated with the digital certificate using the symmetric key, generate a partial key agreement result using a first portion of a split private key, the server having transmitted a second portion of the split private key to the client, the split private key being associated with the client public key, and transmit the encrypted payload and the partial key agreement result to the client, wherein the client is configured to derive the symmetric key for decrypting the payload using the partial key agreement result.

Another apparatus for provisioning a client with a digital certificate is described. The apparatus may include means for receiving, at a server and from the client, a certificate request, the client being associated with a client public key, means for generating, by the server, in response to receiving the certificate request, a short-lived asymmetric key pair, means for generating, by the server, a symmetric key using the client public key and a short-lived private key of the short-lived asymmetric key pair, means for encrypting a payload that includes the digital certificate and a new private key associated with the digital certificate using the symmetric key, means for generating a partial key agreement result using a first portion of a split private key, the server having transmitted a second portion of the split private key to the client, the split private key being associated with the client public key, and means for transmitting the encrypted payload and the partial key agreement result to the client, wherein the client is configured to derive the symmetric key for decrypting the payload using the partial key agreement result.

A non-transitory computer-readable medium storing code for provisioning a client with a digital certificate is described. The code may include instructions executable by a processor to receive, at a server and from the client, a certificate request, the client being associated with a client public key, generating, by the server, in response to receive the certificate request, a short-lived asymmetric key pair, generating, by the server, a symmetric key used the client public key and a short-lived private key of the short-lived asymmetric key pair, encrypt a payload that includes the digital certificate and a new private key associated with the digital certificate using the symmetric key, generate a partial key agreement result using a first portion of a split private key, the server having transmitted a second portion of the split private key to the client, the split private key being associated with the client public key, and transmit the encrypted payload and the partial key agreement result to the client, wherein the client is configured to derive the symmetric key for decrypting the payload using the partial key agreement result.

Some examples of the method, apparatuses, and non-transitory computer-readable medium described herein may further include operations, features, means, or instructions for generating a first key pair including the client public key and a private key based at least in part on receiving the certificate request, generating, based at least in part on the private key, the split private key including the first portion of the split private key and the second portion of the split private key, and transmitting, to the client, an indication of the second portion of the split private key, wherein the server may be configured to receive the certificate request from the client based at least in part on transmitting the indication of the second portion of the split private key to the client.

In some examples of the method, apparatuses, and non-transitory computer-readable medium described herein, transmitting the indication of the first portion of the split private key may include operations, features, means, or instructions for generating an encoded version of the second portion of the split private key and causing display of the encoded version of the first portion of the split private key on a user interface of a computing device.

In some examples of the method, apparatuses, and non-transitory computer-readable medium described herein, generating the encoded version of the first portion of the split private key may include operations, features, means, or instructions for generating a quick response (QR) code, wherein the QR code may be displayed to a user on the user interface.

In some examples of the method, apparatuses, and non-transitory computer-readable medium described herein, transmitting the indication of the first portion of the split private key may include operations, features, means, or instructions for causing a first sub portion of the second portion of the split private key to be stored at the client and causing display of a second sub portion of the split private key to be displayed by a user interface of the client.

Some examples of the method, apparatuses, and non-transitory computer-readable medium described herein may further include operations, features, means, or instructions for storing the first portion of the split private key in association with the client public key.

Some examples of the method, apparatuses, and non-transitory computer-readable medium described herein may further include operations, features, means, or instructions for generating an elliptic curve key pair as the short-lived asymmetric key pair including the short-lived private key and a short-lived public key based at least in part on receiving the certificate request and generating the symmetric key using the short-lived private key and the client public key, wherein the partial key agreement result may be generated using the first portion of the split private key and the short-lived public key such that the client may be able to derive the symmetric key using the second portion of the split private key and the short-lived public key of the short-lived asymmetric key pair.

Some examples of the method, apparatuses, and non-transitory computer-readable medium described herein may further include operations, features, means, or instructions for erasing the short-lived private key from memory in response to generating the symmetric key using the short-lived private key, the erasing resulting in the respective short-lived private key being a one-time use key.

Some examples of the method, apparatuses, and non-transitory computer-readable medium described herein may further include operations, features, means, or instructions for generating a digital signature of the encrypted payload using a server signing private key such that the client may be able to verify the encrypted payload using a server signing public key.

Some examples of the method, apparatuses, and non-transitory computer-readable medium described herein may further include operations, features, means, or instructions for receiving the digital certificate from a trusted certificate authority based at least in part on receiving the certificate request.

In some examples of the method, apparatuses, and non-transitory computer-readable medium described herein, generating, by the service, the digital certificate based at least in part on receiving the certificate request.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, read only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for provisioning a client with a digital certificate, comprising:
   receiving, at a server and from the client, a certificate request, the client being associated with a client public key;
   generating, by the server, in response to receiving the certificate request, a short-lived asymmetric key pair;
   generating, by the server, a symmetric key using the client public key and a short-lived private key of the short-lived asymmetric key pair;
   encrypting a payload that includes the digital certificate and a new private key associated with the digital certificate using the symmetric key;
   generating a partial key agreement result using a first portion of a split private key, the server having transmitted a second portion of the split private key to the client, the split private key being associated with the client public key; and
   transmitting the encrypted payload and the partial key agreement result to the client, wherein the client is configured to derive the symmetric key for decrypting the payload using the partial key agreement result.

2. The method of claim 1, further comprising:
   generating a first key pair including the client public key and a private key based at least in part on receiving the certificate request;
   generating, based at least in part on the private key, the split private key including the first portion of the split private key and the second portion of the split private key; and
   transmitting, to the client, an indication of the second portion of the split private key, wherein the server is configured to receive the certificate request from the client based at least in part on transmitting the indication of the second portion of the split private key to the client.

3. The method of claim 2, wherein transmitting the indication of the first portion of the split private key comprises:
   generating an encoded version of the second portion of the split private key; and
   causing display of the encoded version of the first portion of the split private key on a user interface of a computing device.

4. The method of claim 3, wherein generating the encoded version of the first portion of the split private key comprises:
   generating a quick response (QR) code, wherein the QR code is displayed to a user on the user interface.

5. The method of claim 2, wherein transmitting the indication of the first portion of the split private key comprises:
   causing a first sub portion of the second portion of the split private key to be stored at the client; and causing display of a second sub portion of the split private key to be displayed by a user interface of the client.

6. The method of claim 1, further comprising:
storing the first portion of the split private key in association with the client public key.

7. The method of claim 1, further comprising:
generating an elliptic curve key pair as the short-lived asymmetric key pair including the short-lived private key and a short-lived public key based at least in part on receiving the certificate request; and
generating the symmetric key using the short-lived private key and the client public key, wherein the partial key agreement result is generated using the first portion of the split private key and the short-lived public key such that the client is able to derive the symmetric key using the second portion of the split private key and the short-lived public key of the short-lived asymmetric key pair.

8. The method of claim 7, further comprising:
erasing the short-lived private key from memory in response to generating the symmetric key using the short-lived private key, the erasing resulting in the respective short-lived private key being a one-time use key.

9. The method of claim 1, further comprising:
generating a digital signature of the encrypted payload using a server signing private key such that the client is able to verify the encrypted payload using a server signing public key.

10. The method of claim 1, further comprising:
receiving the digital certificate from a trusted certificate authority based at least in part on receiving the certificate request.

11. The method of claim 1, further comprising:
generating, by the server, the digital certificate based at least in part on receiving the certificate request.

12. An apparatus for provisioning a client with a digital certificate, comprising:
a processor;
memory coupled with the processor; and
instructions stored in the memory and executable by the processor to cause the apparatus to:
receive, at a server and from the client, a certificate request, the client being associated with a client public key;
generate, by the server, in response to receiving the certificate request, a short-lived asymmetric key pair;
generate, by the server, a symmetric key used the client public key and a short-lived private key of the short-lived asymmetric key pair;
encrypt a payload that includes the digital certificate and a new private key associated with the digital certificate using the symmetric key;
generate a partial key agreement result using a first portion of a split private key, the server having transmitted a second portion of the split private key to the client, the split private key being associated with the client public key; and
transmit the encrypted payload and the partial key agreement result to the client, wherein the client is configured to derive the symmetric key for decrypting the payload using the partial key agreement result.

13. The apparatus of claim 12, wherein the instructions are further executable by the processor to cause the apparatus to:
generate a first key pair including the client public key and a private key based at least in part on receiving the certificate request;
generate, based at least in part on the private key, the split private key including the first portion of the split private key and the second portion of the split private key; and
transmit, to the client, an indication of the second portion of the split private key, wherein the server is configured to receive the certificate request from the client based at least in part on transmitting the indication of the second portion of the split private key to the client.

14. The apparatus of claim 13, wherein the instructions to transmit the indication of the first portion of the split private key are executable by the processor to cause the apparatus to:
generate an encoded version of the second portion of the split private key; and
cause display of the encoded version of the first portion of the split private key on a user interface of a computing device.

15. The apparatus of claim 14, wherein the instructions to generate the encoded version of the first portion of the split private key are executable by the processor to cause the apparatus to:
generate a quick response (QR) code, wherein the QR code is displayed to a user on the user interface.

16. The apparatus of claim 13, wherein the instructions to transmit the indication of the first portion of the split private key are executable by the processor to cause the apparatus to:
cause a first sub portion of the second portion of the split private key to be stored at the client; and
cause display of a second sub portion of the split private key to be displayed by a user interface of the client.

17. A non-transitory computer-readable medium storing code for provisioning a client with a digital certificate, the code comprising instructions executable by a processor to:
receive, at a server and from the client, a certificate request, the client being associated with a client public key;
generate, by the server, in response to receiving the certificate request, a short-lived asymmetric key pair;
generate, by the server, a symmetric key used the client public key and a short-lived private key of the short-lived asymmetric key pair;
encrypt a payload that includes the digital certificate and a new private key associated with the digital certificate using the symmetric key;
generate a partial key agreement result using a first portion of a split private key, the server having transmitted a second portion of the split private key to the client, the split private key being associated with the client public key; and
transmit the encrypted payload and the partial key agreement result to the client, wherein the client is configured to derive the symmetric key for decrypting the payload using the partial key agreement result.

18. The non-transitory computer-readable medium of claim 17, wherein the instructions are further executable by the processor to:
generate a first key pair including the client public key and a private key based at least in part on receiving the certificate request;

generate, based at least in part on the private key, the split private key including the first portion of the split private key and the second portion of the split private key; and transmit, to the client, an indication of the second portion of the split private key, wherein the server is configured to receive the certificate request from the client based at least in part on transmitting the indication of the second portion of the split private key to the client.

19. The non-transitory computer-readable medium of claim 18, wherein the instructions to transmit the indication of the first portion of the split private key are executable by the processor to:

generate an encoded version of the second portion of the split private key; and cause display of the encoded version of the first portion of the split private key on a user interface of a computing device.

20. The non-transitory computer-readable medium of claim 19, wherein the instructions to generate the encoded version of the first portion of the split private key are executable by the processor to:

generate a quick response (QR) code, wherein the QR code is displayed to a user on the user interface.

* * * * *